United States Patent [19]
Rush, III

[11] Patent Number: 5,546,609
[45] Date of Patent: Aug. 20, 1996

[54] HELMET

[76] Inventor: Gus A. Rush, III, 1800 12th St., Meridian, Miss. 39301

[21] Appl. No.: 288,078

[22] Filed: Aug. 10, 1994

Related U.S. Application Data

[63] Continuation-in-part of Ser. No. 66,670, May 25, 1993, Pat. No. 5,390,367, which is a continuation-in-part of Ser. No. 964,875, Oct. 22, 1992, Pat. No. 5,287,562, which is a continuation-in-part of Ser. No. 818,840, Jan. 10, 1992, abandoned.

[51] Int. Cl.⁶ .............................. A42B 3/06; A42B 3/30
[52] U.S. Cl. ..................... 2/413; 2/422; 2/424; 2/425; 2/906; 455/100
[58] Field of Search ............................... 2/422, 411, 413, 2/415, 424, 425, 2, 905, 906; 362/103, 105, 106; 455/100

[56] References Cited

U.S. PATENT DOCUMENTS

| | | |
|---|---|---|
| 4,243,248 | 1/1981 | Scholz . |
| 4,274,161 | 6/1981 | Littler . |
| 4,321,433 | 3/1982 | King ........................................ 2/422 X |
| 4,324,005 | 4/1982 | Willis . |
| 4,637,074 | 1/1987 | Tacfri . |
| 4,654,010 | 3/1987 | Havriluk ............................. 455/100 X |
| 4,931,913 | 6/1990 | Hwang .................................... 362/103 |
| 5,091,992 | 3/1992 | Pusic . |
| 5,329,637 | 7/1994 | Walker ................................ 455/100 X |
| 5,353,008 | 10/1994 | Eikenberry et al. .................... 2/422 X |

FOREIGN PATENT DOCUMENTS

| | | |
|---|---|---|
| 1944821 | 3/1971 | Germany . |
| 3142962 | 6/1983 | Germany . |

*Primary Examiner*—Peter Nerbun
*Attorney, Agent, or Firm*—Cushman Darby & Cushman, L.L.P.

[57] ABSTRACT

A helmet assembly for providing an indication when a predetermined axial compressive force tending to cause serious injury to the wearer is applied thereto. The assembly comprises a rigid helmet having a lower rim for at least partially encircling the head of the wearer. The helmet is defined by an exterior surface including a crown areal. A transmitting device is carried by the helmet for transmitting a signal to a remote location when a predetermined amount of axial compressive force is applied to the crown area. Receiving means disposed remotely from the helmet receives the signal transmitted by the transmitting device.

31 Claims, 7 Drawing Sheets

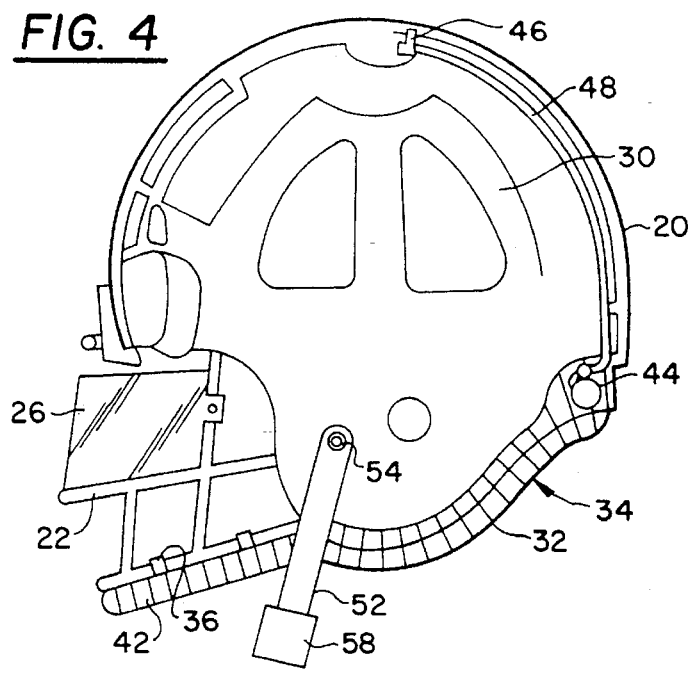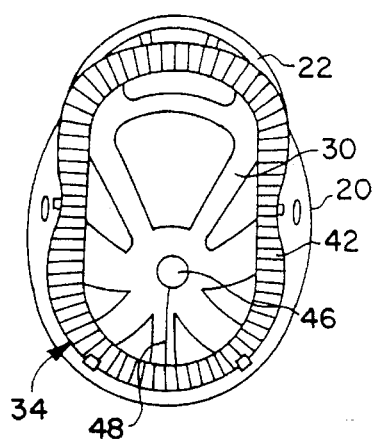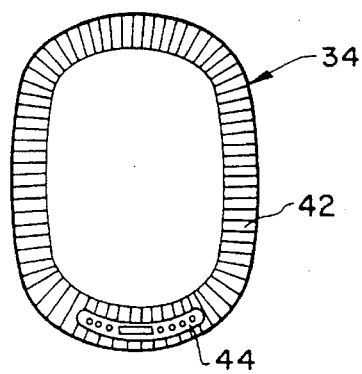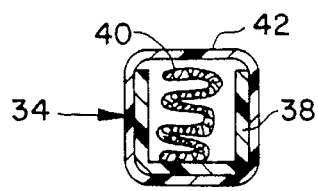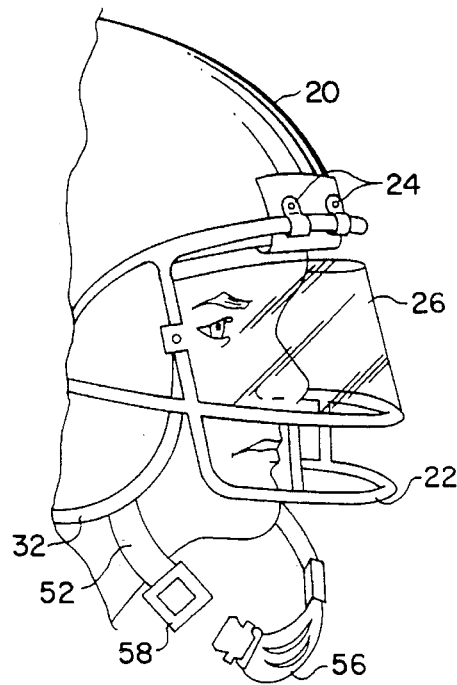

HELMET

This application is a continuation-in-part of application Ser. No. 08/066,670, filed May 25, 1993, now U.S. Pat. No. 5,390,367 which is a continuation-in-part of application Ser. No. 964,875, filed Oct. 22, 1992, now U.S. Pat. No. 5,287,562 which is a continuation-in-part of application Ser. No. 07/818,840, filed Jan. 10, 1992, now abandoned.

FIELD OF THE INVENTION

This invention relates to a helmet which will prevent damaging axial compressive forces, occasioned by impacts to the crown area of the head, i.e. the helmet, from being transmitted to the cervical spine of the wearer. The invention is particularly applicable to football helmets but is equally useful for helmets in those other activities where there is a chance of a severe impact to the top or crown area of the head, e.g. ice hockey players, car racing drivers, motorcyclists, construction workers in hard hat areas, etc.

This invention also relates to helmets which provide a signal or indication that the wearer has participated in activity which can be potentially dangerous to the wearer. Such signal or indication can be provided to the wearer himself or a remote observer.

This invention also relates to shoulder pads, such as those used by football players, which are adapted to cooperate with the above-described type of helmet in order to improve the function thereof.

BACKGROUND OF THE INVENTION

Efforts have been made to minimize cervical spine injuries to football players, motorcyclists, and others who may be involved in collisions, related impacts or blows. In the past, hyperflexion and hyperextension injuries to the neck were considered to be the primary mechanisms responsible for severe cervical spine trauma. Many types of neck rolls or collars, both foam and inflatable, have been tried, as have check straps, to limit flexion and extension of the cervical spine. Thus, for example the U.S. Pat. No. 3,855,631, to Ettinger, Dec. 24, 1974, discloses an inflatable protective neck collar for a football player. The collar is a separate element but is constantly inflated after being put on to fill the gap between the head and shoulders, thus inhibiting free movement of the head. Further, the collar is inflated only to the extent that normal head and neck movements allegedly are unimpeded. Accordingly, severe impact forces to the crown of the helmet still are transmitted to the cervical spine.

Similar inflatable neck collars have been designed for motorcyclists which normally are deflated but inflate automatically on a collision. See, for example, European patent 0,043,990, published Jan. 20, 1982, and German patent 2,717,712, Oct. 26, 1978. In both, however, the collars are not inflated automatically on impact on the crown of the helmet but instead on collision of the motorcycle. Still further, the impact sensor, gas generator, igniter and battery are not carried by the helmet. Additionally, neither patent discloses a construction which will specifically protect the wearer against serious cervical spine injuries on an impact to the crown of the helmet.

There also has been devised in U.S. Pat. No. 3,134,106 to Shaffer et al, dated May 26, 1964, a protective football helmet arrangement wherein the helmet is rigidly fixed to the shoulder pads so as to allow absolutely no motion of the helmet relative to the shoulders, but the head is free to turn therein, however, this arrangement is highly impractical and is not in use.

German Laid-Open Patent Application 3,142,962 to Seeger et al. describes a motorcycle helmet having an inflatable bag on its lower rim and a mechanism for inflating the bag when acceleration sensors detect a sudden change in acceleration of the wearer, e.g., in a collision. This helmet is designed to prevent injuries caused by lateral and twisting forces resulting from the rider's inertia and the sudden stop of the motorcycle. The horseshoe shape of the inflatable bag in the Seeger et al. device will not prevent injuries resulting from axial compressive forces such as those that occur in football games. Moreover, studies have shown that injuries of this type occur within approximately 30 milliseconds of impact, and the 300 to 500 millisecond reaction time of the Seeger et al. helmet would therefore be ineffective for this purpose.

All of the above efforts have attempted primarily to limit flexion and extension of the spine and also, to some extent, axial compression. However, they did not allow full cervical range of motion and provide instantaneous cervical support when required.

There have been tremendous advances in helmet design and shoulder pad function recently. Helmets now are of variable density polycarbonate shells with pneumatic webs that are inflatable to fit a player's head. Face guards are well-designed to give clear and unobstructed vision and prevent finger-to-face contact. Shoulder pads are equally well engineered to avoid shoulder and clavicle injuries on impact. The weakest link, the cervical spine, has had little (if any) protection. The only preventive measures to date have been education to coaches and players, avoidance of "spearing" i.e. using the head as a battering ram to butt an opponent, and strengthening of the neck muscles and the cervical spine. In reality, however, there is no currently available device to instantaneously stabilize the cervical spine on axial impact.

The mechanism of the typical cervical spine injury in football is as follows. A player flexes his head to spear an opponent, the helmet stops and the trunk compresses the fragile cervical spine like an accordion. Initially, the disks are compressed, followed by the bony vertebrae. The cervical nerve roots are compressed and the player feels "burners" or "stingers" in his arms. If compressed further, the spine flexes and then fractures, subluxes or dislocates.

The most catastrophic head and neck injuries in tackle football are quadriplegia and death. Detailed analysis has determined that most of such serious cervical spine injuries in tackle football have been caused by axial loading, i.e., impact directly on the crown of the helmet. This occurs in "spearing" . See "Prevention of Cervical Spine Injuries In Football" in the periodical "The Physician And Sportsmedicine" Vol 19, No. 10 October 1991.

SUMMARY OF THE INVENTION

Thus, it is an object of this invention to provide a protective helmet with an apparatus which will minimize or prevent the transmission of damaging axial compressive forces to the cervical spine of the wearer from impacts on the helmet giving rise to such forces. Thus, the cervical spine is protected from repetitive axial trauma which can initially cause cervical strain and later lead to microfractures, nerve root injuries, fractures and ultimately, quadriplegia.

It is another object of this invention to provide such apparatus which is relatively simple, inexpensive and neither impedes normal head and neck movements of the wearer nor obscures the wearer's vision at any time.

It is a further object of this invention to provide such apparatus which will minimize the reaction time in which it will be activated to protect the wearer after impact.

It is a further object of this invention to provide such apparatus as a further means for helping absorb impact.

It is a further object of this invention to provide shoulder pads, which are cooperable with a helmet to help minimize or prevent the transmission of damaging axial compressive forces to the cervical spine of the wearer from impacts on the helmet.

In another embodiment, it is a still further object of this invention to provide a helmet with a signal device to sound an audible alarm signal or to display a visual indication when the helmet wearer experiences an axial compressive force above a selected force level such as occurs when the wearer engages in head spearing.

In still another embodiment, it is an object of this invention to provide a helmet that transmits a signal to a remote observer to provide an indication to said observer that the wearer of the helmet has participated in potentially self-injurious activity.

The above objects are accomplished by providing a protective helmet with an attachment in the form of a ring fastened to the lower rim or base of the helmet and to the lower part of the face guard, if any, and encircling the neck of the wearer. The helmet is also provided with an apparatus disposed on the exterior surface of the helmet at the crown portion thereof to substantially instantaneously deploy or extend the attachment downward into engagement with the shoulders of the wearer on an impact on the crown area of the helmet with a predetermined force. Thus, the impact force is transmitted or transferred through the attachment mainly to the shoulders and to some extent to the torso in front of and behind the neck, thus relieving the cervical spine of the damaging compressive forces.

By providing the helmet with the apparatus disposed on the exterior surface of the helmet at the crown portion thereof, the reaction time of the deployment of the attachment is greatly reduced over that in the prior art. The reaction time is almost instantaneous upon impact on the crown area of the helmet with a predetermined force. In one embodiment, the attachment is an inflatable bag in the form of a ring attached to the lower rim or base of the helmet and encircling the neck of the wearer. The attachment extends downward into engagement with the shoulders apparatus by almost instantaneously inflating and deploying the bag on impact. On such inflation, the bag fills the gap between the shoulders of the wearer and the lower rim or base of the helmet and the lower part of the face guard, if any, attached to the helmet. Thus, the impact force is transmitted or transferred through the deployed bag mainly to the shoulders and to some extent to the torso in front of and behind the neck, thus relieving the cervical spine of damaging axial compressive forces. The bag is constructed to automatically deflate immediately following such rapid inflation so as to not further impede normal head and neck movements. The bag is similar to that used in automotive vehicles to provide supplemental restraint to occupants in a collision and can be deployed in 25 milliseconds or less. Examples of such bags are disclosed in U.S. Pat. Nos. 3,430,979, 4,178,016 and 4,243,248. Once deployed, the air bag can support impact forces of 500 lbs or more.

In another embodiment, the attachment is in the form of a rigid padded ring attached to and conforming to the contour of the lower rim or base of the helmet and the lower part of the face guard, if any. The attachment is detachable from the helmet and can be driven downward into engagement with the shoulders of the wearer by a gas-operated piston and cylinder arrangement carried by the helmet. The helmet is also provided with an apparatus to almost instantaneously operate the piston and cylinder arrangement and drive the attachment down into engagement with the shoulders of the wearer on an impact to the crown area of the helmet with a predetermined force. Thus, the impact force is transmitted or transferred mainly to the shoulders of the wearer as in the preferred embodiment. This version can support greater weights than the air bag version due to its ratcheting feature.

In another embodiment, shoulder pads are provided with an attachment similar to that provided on the helmet. The shoulder-pad attachment is an inflatable bag in the form of a ring attached to the inner rim of the shoulder pad encircling the neck of the wearer. The shoulder pad attachment extends inwards, just enough to instantaneously broaden the foundation on which the helmet attachment can rest when deployed upon impact, and without harming the wearers's neck.

In another embodiment, the shoulder pads are provided with an internal inflatable bag, which, when inflated upon impact at the helmet crown, operates to raise the shoulder pads towards the lower rim of the helmet to fill the gap between the shoulders of the wearer and the lower rim or base of the helmet and the lower part of the face guard, if any, attached to the helmet. In this embodiment, the helmet is provided with its lower rim having an outwardly extending flare to contact the shoulder pads when inflated.

BRIEF DESCRIPTION OF THE DRAWINGS

FIG. 4 is a vertical sectional view of the helmet shown in FIG. 2, including an improved chin strap embodying this invention;

FIG. 5 is a bottom view of the helmet shown in FIG. 1;

FIG. 6 is a bottom, partly cut away, view of the inflatable ring module shown in FIG. 1;

FIG. 7 is an enlarged cross-sectional view of the module shown in FIG. 6;

FIG. 8 is a fragmentary perspective view of a football player wearing a helmet embodying the preferred embodiment of this invention but omitting the inflatable ring module;

DETAILED DESCRIPTION OF THE PREFERRED EMBODIMENT

Figure 1:
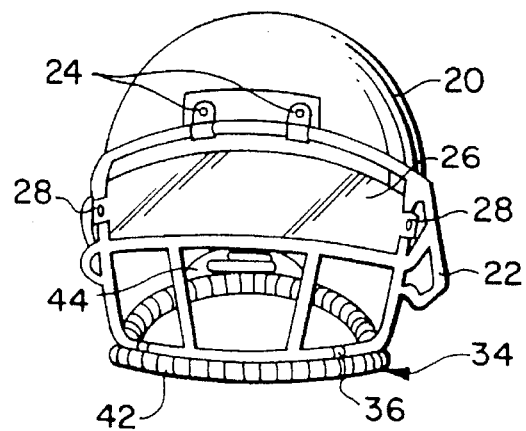
FIG. 1 is a front view of a football helmet embodying this invention but omitting the usual chin strap for clarity.
Figure 2:
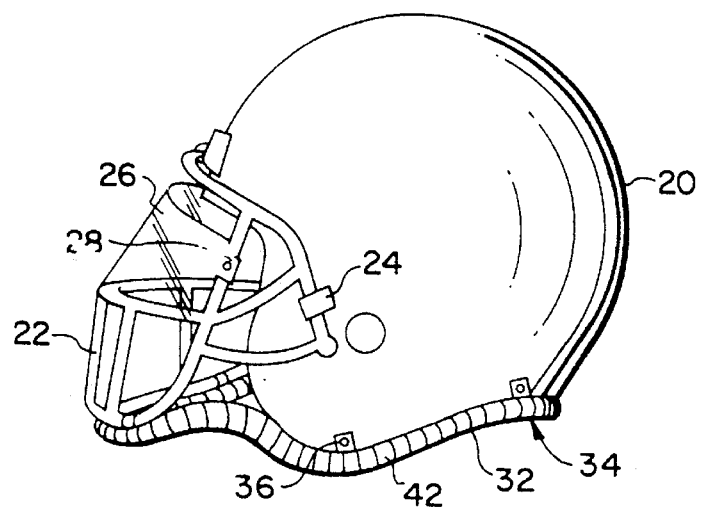
FIG. 2 is a side view of the helmet shown in FIG. 1.
Figure 3:
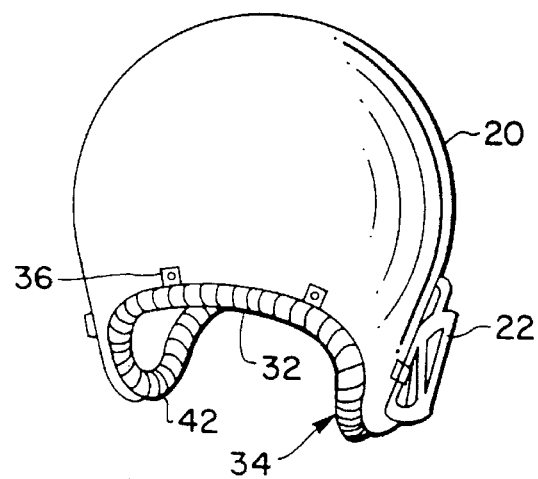
FIG. 3 is a rear perspective view of the helmet shown in FIG. 1.

Referring now to the drawings, there is shown a conventional football helmet 20 preferably made of a strong plastic material, e.g., polycarbonate, and having a face guard 22 secured thereto by the usual clips or brackets 24. The guard 22 differs from some conventional guards in that the usual vertical bar covering the nose and extending between the top and bottom bars of the guard is omitted and instead a clear plastic eyeshield 26 is attached to side bars of the guard by conventional clips or brackets 28. Within the helmet 20 is padded webbing 30, as shown in FIGS. 4 and 5, which preferably is inflatable, as in well designed helmets currently in use, so as to snugly accommodate the size of the wearer's head.

Attached to the lower rim or base 32 of the helmet 20 and extending along the sides and rear thereof, and to the lower transverse bar of the face guard 22, and for the most part following the contours of the base and bar, is an inflatable ring module 34 of somewhat oval configuration, as shown in FIGS. 5 and 6, which is attached to the face guard and the helmet by conventional clips or brackets 36. As best shown in FIG. 7, the inflatable ring module 34 has a channel-like shell 38 made of light weight plastic material, e.g., polycarbonate. The "U" shape of the shell opens in a direction opposite the crown of the helmet 20 so that when the helmet 20 is worn by a player, the opening faces the player's shoulders. Within the shell 38 is packed in a folded configuration an inflatable bag 40 conventionally made of nylon or similar material. The shell 38 with the bag 40 therein is wrapped with a rupturable membrane 42, e.g. a thin sheet of plastic material which will break and rupture when the bag is inflated but strong enough to retain the bag folded in the shell during normal football activities. Preferably the membrane 42 is perforated with a pattern to direct the exit of portions of the bag 40 from the shell 38 in desired directions as later described. To inflate the bag 40, there is provided packed within the module 34 at the rear thereof a package 44 containing a conventional battery, igniter and gas generator, as shown in FIGS. 1, 4 and 6. The gas generator has multiple perforations, as shown in FIG. 6, in order to insure even inflation of the bag 40. It will be seen that the ring module 34 allows full, unencumbered rotation and flexion of the neck of a wearer of the helmet 20.

To operate the igniter and almost instantaneously inflate by bag 40, there is provided an impact-operated switch 46 located in the webbing 30 in the crown of the helmet 20 and connected to the battery and igniter by circuit wires 48, as shown in FIGS. 4 and 5. The switch 46 preferably is in the form of an accelerometer that is adjustable to calibrate the amount of impact force on the crown area necessary to close the switch and thus trigger the firing mechanism, i.e., the igniter, to fully inflate the bag 40 in about 25 or so milliseconds.

Figure 9:
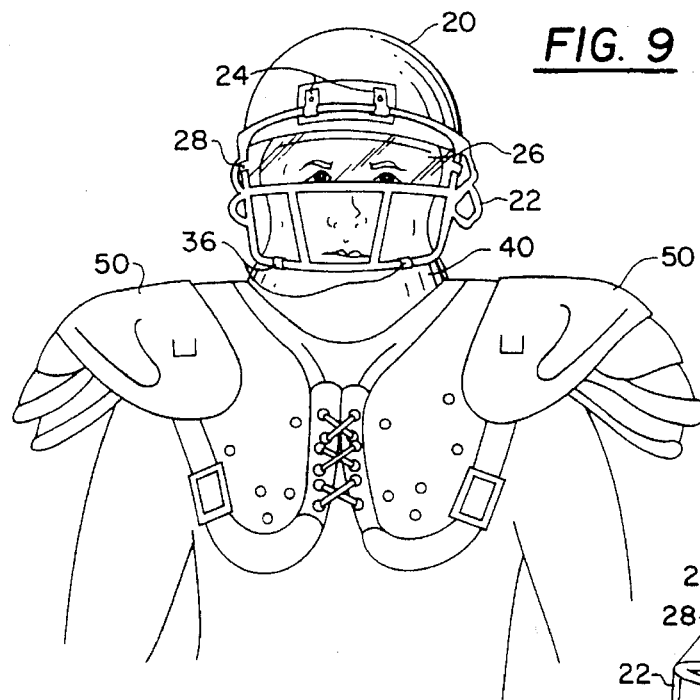
FIG. 9 is a fragmentary front view of a football player wearing conventional shoulder pads and the helmet shown in FIG. 1 with the inflatable ring module inflated and deployed.
Figure 10:
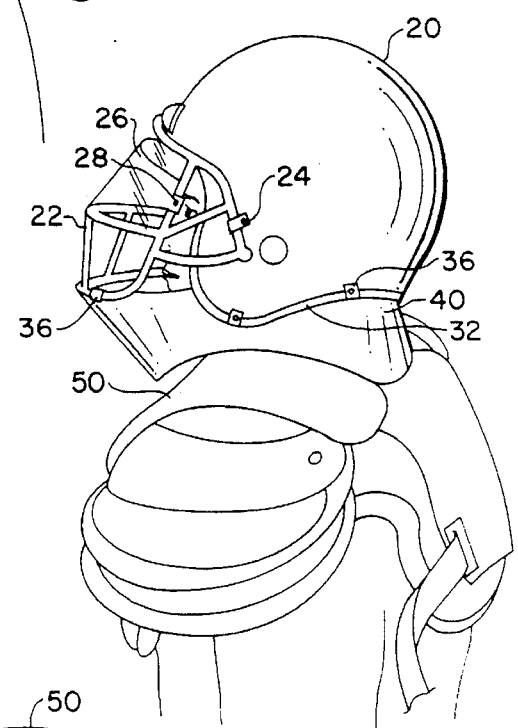
FIG. 10 is a side perspective view of the player shown in FIG. 9.
Figure 11:
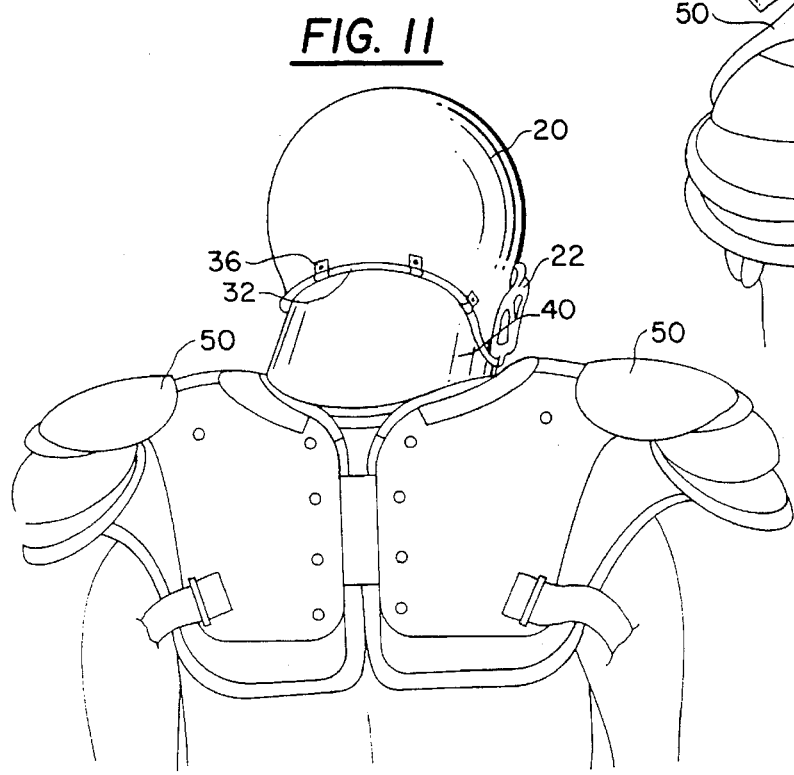
FIG. 11 is a rear perspective view of the player shown in FIG. 9.
Figure 12:
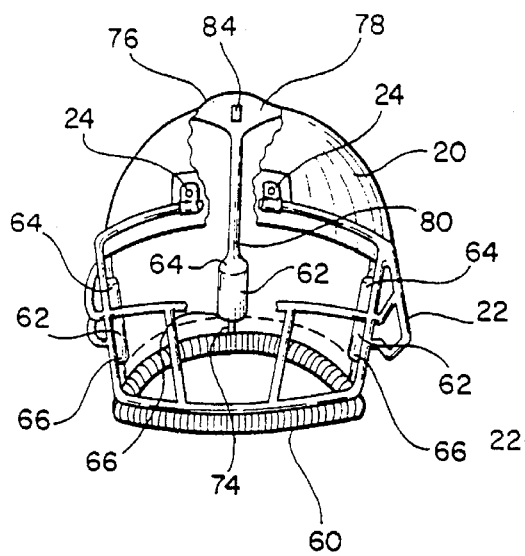
FIG. 12 is a frontal cutaway view of an embodiment of this invention.
Figure 13:
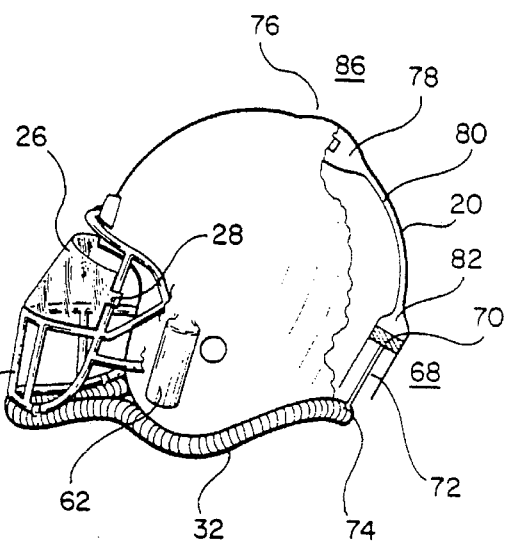
FIG. 13 is a side cutaway view of the helmet shown in FIG. 12.
Figure 14:
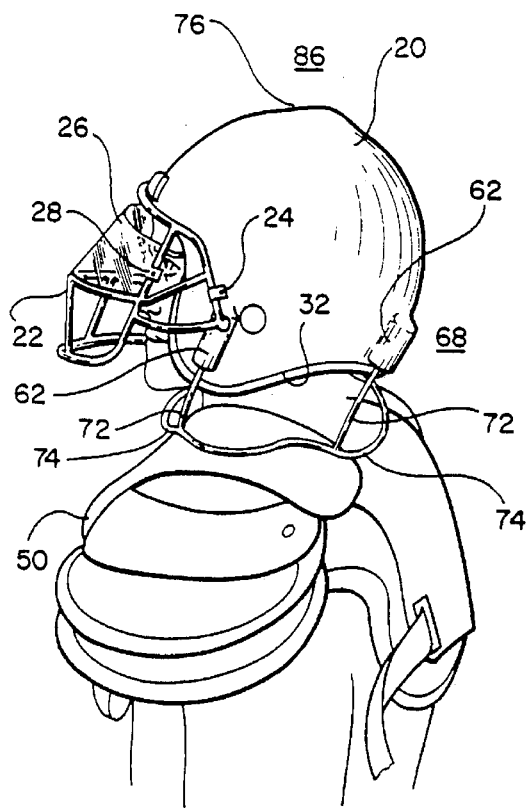
FIG. 14 is a side perspective of a player wearing a helmet according to the present invention.

On inflation the bag 40 ruptures the membrane 42 and deploys out of the shell 38. The membrane 42 is provided with plurality of perforations so that the bag 40 deploys downwardly from module 34 and parallel to the cervical spine along the front and rear portions of the module, as shown in FIGS. 9–11. The reason for this is that the cervical spine is very close to the inflatable module 34 along the sides thereof but more distant along the front and rear portions thereof. Thus, as the bag 40 deploys through the perforated membrane 42 downwardly from module 34, it tends to inflate downward and laterally outward along the sides of the helmet 20 and away from the cervical spine and downward and inward along the front and downward and outward along the rear portions of the helmet generally parallel to the cervical spine. The bag 40 also is made wider along its front and rear portions on its deployment, again as shown in FIGURES 9–11.

Thus, on deployment as shown in FIGS. 10–11, it will be seen that the bag 40 fills the gap between the lower rim or base 32 of the helmet 20 and the lower bar of the face guard 22 and the shoulders or shoulder pads 50 of the wearer and the torso at the front and rear of the neck. Accordingly, on such quick inflation, most if not all of the force of an impact on the crown of the helmet 20 is transferred from the cervical spine directly to the shoulders of the wearer or to shoulder pads 50, if worn, thus relieving the cervical spine of any axial compression due to such impact. Further, the engagement of the bag 40 with the torso at the front and rear of the neck resists rotational movements of the cervical spine. When inflated, the bag 40 also supports the neck from a lateral force such as the elbow or knee of a player in a tackle. Still further, in its deployed position, the bag 40 should prevent excessive flexion, extension or lateral motions of the cervical spine. On its deployment, the bag 40 also will support the cervical spine posteriorly or at the rear of the neck to prevent extension as well as protecting the neck against any direct blow to its posterior and spinous processes of the cervical spine.

As is conventional with protective inflatable bags used in automotive vehicles the bag 40 is appropriately perforated so it will deflate shortly after inflation to allow a wearer to regain substantially unencumbered normal head and neck movements and permit the helmet 20, with the bag attached thereto, to be removed with ease.

In clipping and many other football actions, there is not only a primary impact resulting from the collision of one player with another but also a secondary impact when a player falls or is thrown to the ground as a result of the primary impact. For this reason, the bag 40 may be designed to remain inflated for eight to ten seconds after the initial blow which activates the inflation mechanism. For this purpose, the inflatable bag 40 used in the present invention is preferably coated with Neoprene or a similar substance to permit the bag 40 to be inflated for a longer period of time than is possible with automobile bags.

The improved chin strap 52, which retains the helmet 20 on the head of a wearer, is fastened to the inner sides of the helmet by conventional rivets 54 or the like, as shown in FIG. 4, instead of by the usual detachable snap fastener. The strap 52 may have a single attachment at each end thereof, as shown, or be Y-shaped at its ends for two attachment locations as is usual with conventional helmets. The strap 52 includes the usual padded chin support 56, as shown in FIG. 8. Between one end of the chin support 56 and the helmet 20 the strap is divided and provided with a readily releasable connecting buckle 58 similar to that used for a seat belt in vehicles. The buckle 58 is in two parts, one fastened to one end of the strap 52 and the other to the other end. One buckle part is in the form of a notched tongue which slides into the other buckle part and snap locks therein but can be released by applying a pinching force on one side of the other part, as shown best in FIG. 8. This is much more convenient for a wearer and inhibits accidental detachment of the strap 52 from the helmet 20, as is the case with the usual conventional snap type fasteners between the ends of the strap and the helmet. The sides of the inflatable ring module 34 may have grooves therein, if necessary, to accommodate the strap 52 when fastened in place by the buckle 58.

When bag 40 is inflated, it must reach from the lower rim of helmet 20 over the neck region to the cervical area of the player wearing the helmet. Since the length of the neck region will vary depending on the individual player, it is necessary to design bag to inflate to the greatest length that might be necessary. While this will produce optimal effects for a player with a long neck, it will cause great discomfort to players with shorter necks if the pressure created thereby is not otherwise ameliorated. For this reason, chin strap 52 is preferably made from a dense elastic material similar to the one used by the 3M Corporation in their Lenox Hill knee brace. This material permits an elastic stretch of three to four centimeters. A strap made from a similar material allowing extension of the strap and a corresponding displacement of helmet 20 away from the head of the player wearing it will provide a sufficient "comfort zone" when bag 40 is inflated while preventing accidental removal of the helmet by movement of the player or by inflation of bag 40.

Figure 15:
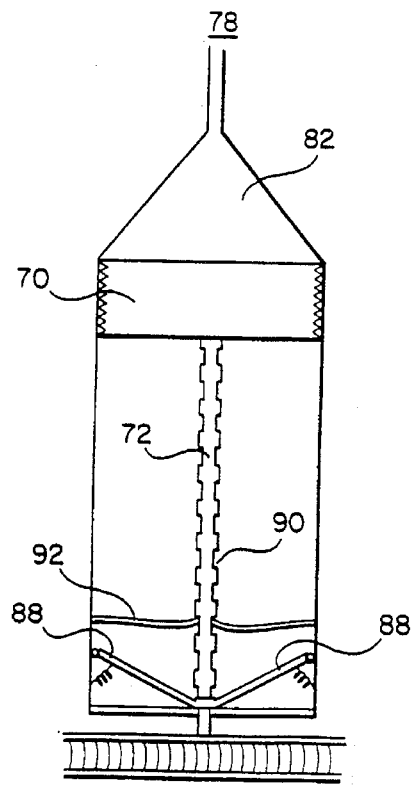
FIG. 15 is a cross-sectional view of a detent/ratchet mechanism for a cylinder used in an embodiment of the present invention.
Figure 16:
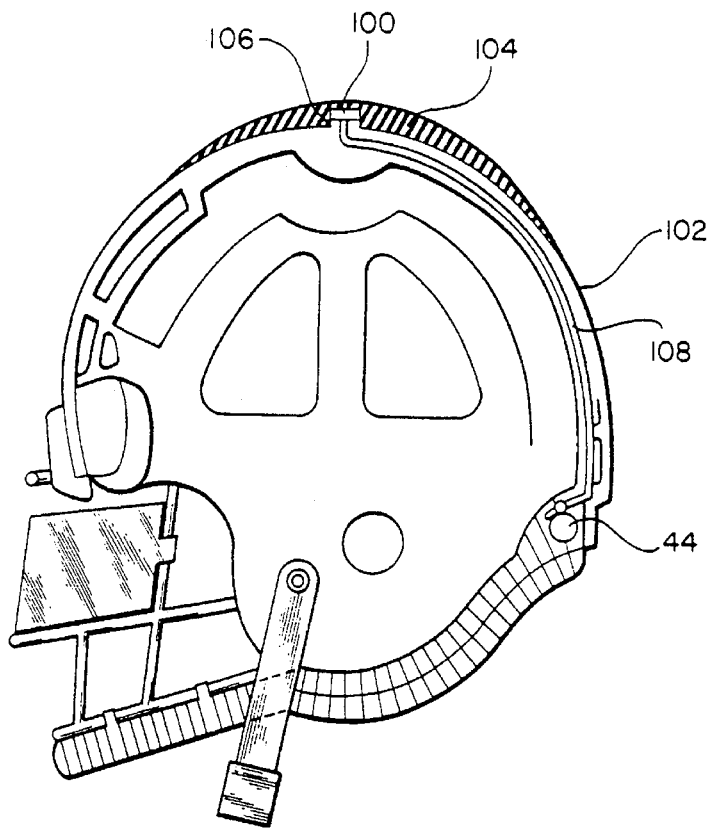
FIG. 16 is a vertical cross-sectional view of the helmet shown in FIG. 2, but including the improved sensor patch of the present invention.

Referring now to FIGS. 12–15 of the drawings, which illustrate the second embodiment of the invention, there is shown a conventional football helmet 20 having a face guard 22 secured thereto like the helmet and face guard of the first embodiment. Attached to the lower rim or base 32 of the helmet 20 and to the lower part of the face guard 22 and conforming to the contour thereof is an attachment 60 generally in the shape of a ring of small cross-section and preferably made of a strong plastic material, e.g., polycarbonate. The attachment 60 preferably is exteriorly padded with a soft cushioning material such as foam rubber. Molded into the helmet 20 at the rear and opposite sides thereof are substantially upright cylinders 62 having closed upper ends 64 and open lower ends 66 generally flush with the edge of the lower rim or base 32 of the helmet. The cylinders may be made of metal or of the plastic of the helmet shell, i.e., integrally molded therein. The molding is such that the interior of the helmet remains smooth to uninterruptedly accommodate the head of the wearer but the cylinders may cause curved smooth bulges 68 on the exterior of the helmet 20. In each cylinder 62 is a piston 70 having a rod 72 with its outer end rigidly fastened to the ring-like attachment 60. The cylinders 62 and rods 72 are long enough so that when the pistons 70 are moved downward, as later explained, the attachment 60 will move down into engagement with the shoulders 50 of the wearer, as shown in FIGS. 15 and 16.

Also molded within the helmet shell 20 but leaving the interior of the latter smooth but with a small exterior smooth bulge 76 is a small gas chamber or manifold 78 connected to the upper ends 64 of the cylinders 62 above the pistons 70 by separate conduits 80 molded into the helmet shell 20. To supply gas to the chamber 82 and to thus operate the cylinders 62 and pistons 70 to drive the attachment 60 down onto the shoulders 50 of the wearer, the helmet 20 may be provided with a package 84 like the package of the first embodiment which contains a conventional battery, igniter and gas generator connected to the gas chamber. The package 84 may be accommodated in an interior depression or compartment molded in the helmet shell and creating another small smooth exterior bulge 76. Alternatively the gas chamber 78 may be large enough to accommodate the package 84. To operate the igniter there may be provided an impact-operated switch like the switch 46 of the preferred embodiment located in the crown of the helmet and connected to the battery and igniter by circuit wires.

In another arrangement, the gas chamber 78 is located in the crown area 86 of the helmet and has a primer, such as that used in a shotgun shell, fixed in the top wall of the chamber, i.e., in the crown area 86 of the helmet. The exterior of the primer is covered with an impermeable membrane with which is engaged a firing pin for the primer. The pin may be fictionally fitted into the shell of the helmet 20 or otherwise mounted to be movable to rupture the membrane and engage and ignite the primer on impact on the crown area 86 of the helmet 20 with a predetermined force. The gas created by the primer will substantially instantaneously operate the pistons 70 and cylinders 62 to drive the ring-like attachment 60 down into engagement with the shoulders 50 of the wearer as described above.

Preferably, within the lower end 74 of each cylinder 62 is a ratchet mechanism engaged with the corresponding rod to firmly retain the rod in its extended position when the shoulders are engaged by the ring-like attachment to positively transfer or transmit the force of the impact to the shoulders 50 of the wearer without the possibility of retraction of the pistons 70 and their rods 72 to alleviate such transmittal.

The pistons 70 and rods 72 may be retained in their retracted positions to hold the ring-like attachment 60 firmly against the lower rim or base 32 of the helmet 20 and the lower part of the face guard 22, if any, by detents which are overcome by the generation of gas to operate the pistons 70 to extend the rods 72 and the attachment 60 as described above.

One type of ratchet/detent mechanism suitable for use with the present invention is shown in FIG. 15. In this Figure, a substantially airtight connection between gas chamber 78 and the interior 82 of cylinder 62 provides a vacuum arrangement preventing piston 70 from being displaced downwardly in normal use. When gas chamber 78 provides gas to chamber 82, thereby driving piston 70 downward, spring-loaded ratchets 88 engage with notches 90 in piston rod 72 to provide a positive engagement mechanism which, due to the downward angle of the ratchets, permits the pistons to move down to extend attachment 60 but does not permit them to move up.

As an alternative or in addition to the vacuum retention feature described above, the piston assemblies may be kept in a retracted position by providing a soft metal split ring 92 engaging with notches 90 on piston rod 72. Ring 92 has sufficient strength to maintain the piston assembly in its retracted position in the absence of pressure on piston 70; however, when gas generator 78 supplies gas to chamber 82 to move piston 70 downward, ring 92 is deformed to allow rod 72 to slide freely therethrough.

FIG. 16 depicts a preferred embodiment of the present invention. There it is shown that switch or sensor 100 is provided externally to the helmet defined by exterior surface 102. Sensor 100 is substantially the same as switch 46 in FIG. 4, and is preferably in the form of an accelerometer that is adjustable to calibrate the amount of impact force on the crown area. By providing sensor 100 externally to the helmet, it has been found that the reaction time thereof is reduced by approximately 5 milliseconds in comparison to the configuration of FIG. 4 in which the sensor 46 is disposed within the helmet. By thus reducing the deployment time of the inflatable bag or extendable polycarbonate ring, there is less possibility of spinal cord injury.

Sensor 100 is embedded in resilient patch 104, which is preferably made of an elastomer, such as rubber, which helps absorb the impact upon the crown area. As shown, the exterior surface 102 has an orifice 106 therein at the crown area of the helmet. The orifice 106 is covered by resilient patch 104 and provides an avenue through which circuit wires 108 can enter the helmet so as to a battery and igniter as described above with respect to FIG. 4. It can be appreciated that while the entire sensor 100 is shown externally to the helmet as defined by exterior surface 102 in FIG. 16, it is possible for sensor 100 to be held by orifice 106 so that only a portion thereof protrudes through the orifice externally of the helmet.

Figure 19:
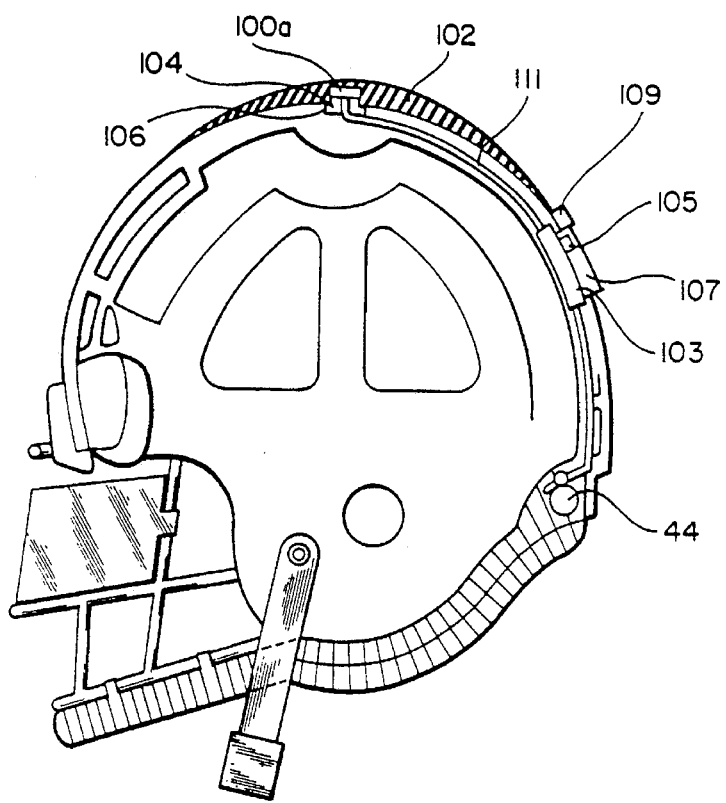
FIG. 19 is a view similar to FIG. 16 but showing an embodiment of this invention where a signal device in installed in the helmet and a sensor is provided to activate the signal when an axial, compressive impact of a selected magnitude is experienced by the wearer.

In FIG. 19, another embodiment of the helmet is shown having a sensor 100a embedded in the same manner as sensor 100 described above in connection with FIG. 16. In addition, a signal device 103 which may be audible but may also or in the alternative provide a visual signal is installed in the helmet. A small battery 105 is provided to power the device 103. A small speaker 107 and/or a light 109 is installed such as at the rear of the helmet opposite the face mask. In use, the sensor 100a, when activated by an axial load caused, for example, by a spearing movement of the wearer, will function to close the circuit 111 between the battery and the device 103 to produce the audible and/or visual signal so that the supervisor or coach will be alerted to the spearing action of the wearer and thus be able to caution the individual against such action. The sensor 103 is preferably adjustable so that the magnitude of the axial impact experienced may be varied to accommodate players of different ages and sizes and to minimize the accidental actuation of the signal. It will be evident that the signalling device may be used with or without the inflatable collar bag.

Figure 20A:
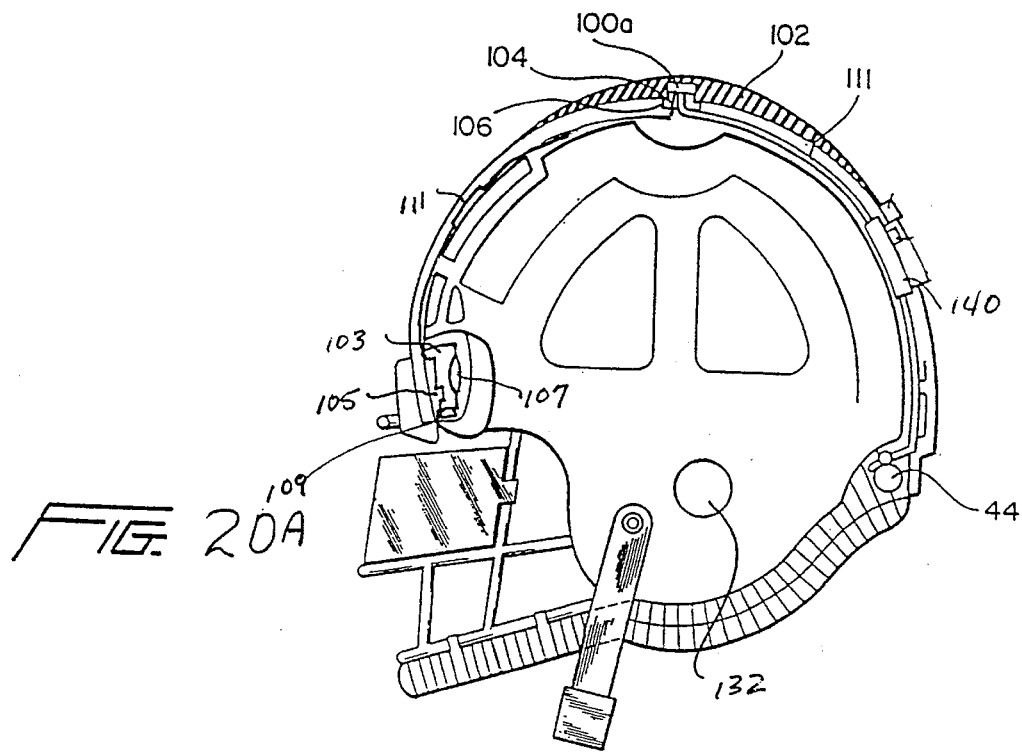
FIG. 20 is a view similar to that of FIG. 19, but showing an embodiment of this invention wherein a transmitter and receiver are provided to transmit a signal to a remote location to indicate that the helmet wearer has participated in potentially self-injurious activity.
Figure 20B:
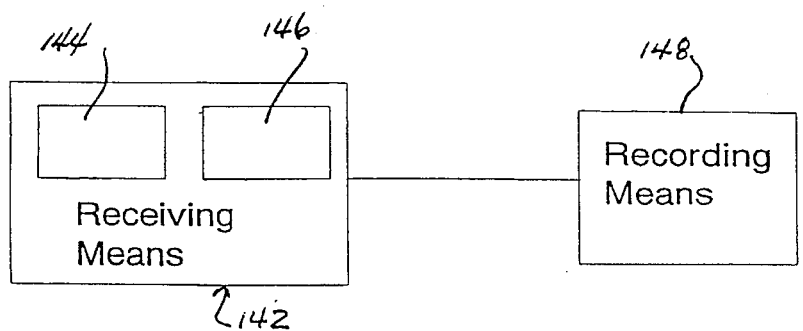

In FIG. 20, there is shown another embodiment of the present invention. The embodiment in FIG. 20 is similar to that in FIG. 19, but includes a transmitting device 140 carried by the helmet for transmitting a signal to a remote location when a predetermined amount of compressive axial force is applied to the crown area of the helmet. The sensor 100a actuates the transmitting device when the aforementioned force is applied. Receiving means 142 is disposed remotely from the helmet, and is adapted to receive the signal transmitted by the transmitting device 140. The receiving means is preferably a held device, which can be carried by a remote observer (such as a player coach or medical technician). The receiving means may include an indicating means such as speaker 144 for making an audible sound and/or a visual indicator 146 for making a visual signal to alert the remote observer that the helmet wearer has participated in potentially self-injurious activity. The visual indicator 146 can be in the form of a simple light, or in the form of an LED display that indicates which helmet (if a plurality of such helmets are in use) has participated in the potentially injurious activity.

The transmitter 140 may transmit signals in the form of radiowaves, infra-red waves, or any other type of transmission waves which can be remotely received by a receiving means. Similarly, receiving means 142 can be any type of device capable of remotely receiving transmission waves from the transmitter carried by the helmet.

It may also be advantageous to provide a recording means 148 which is cooperable with the receiving means 142 to record instances in which the potentially injurious activity has taken place. In this manner, it is possible to monitor players who participate in such injurious activity with regularity and to take appropriate measures based on the recorded data. The recording means may record the time and date of each instance in which the potentially injurious activity occurs. The recording means can take many different forms, such as a hard disk drive or a chart recorder, as two possible examples.

In FIG. 20, the signal device 103 is shown within the helmet at a forward portion thereof. Here, the light 109 is positioned so that it is visible to the wearer so as to provide the wearer with an indication that he or she is participating in the potentially injurious activity. This enables the wearer to self-monitor his or her behavior or physical activity (e.g., tackling techniques). As also shown in FIG. 20, a speaker 107 is likewise provided towards the front of the helmet. It can be appreciated, however, that the speaker can be placed closer to the earhole 132 to enhance the audibility of the signal provided to the wearer.

Figure 17A:
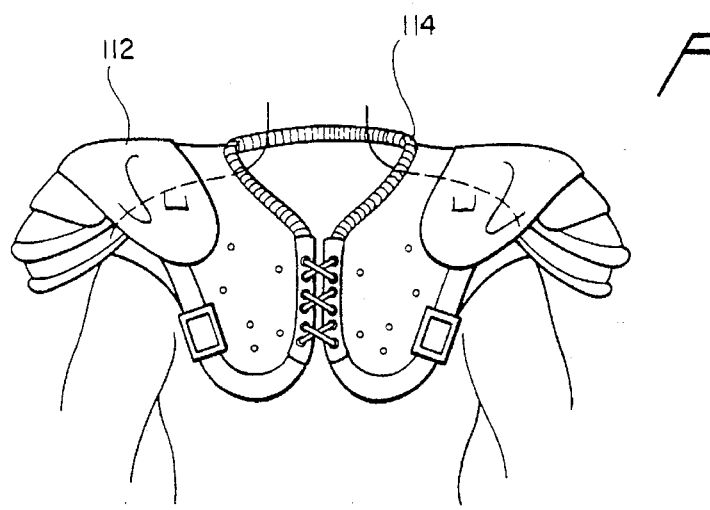
FIG. 17a is a front perspective of a player wearing a shoulder pad having an attachment, including an inflatable bag therein, along the inner rim encircling the neck of the wearer according to an embodiment of the present invention.
Figure 17B:
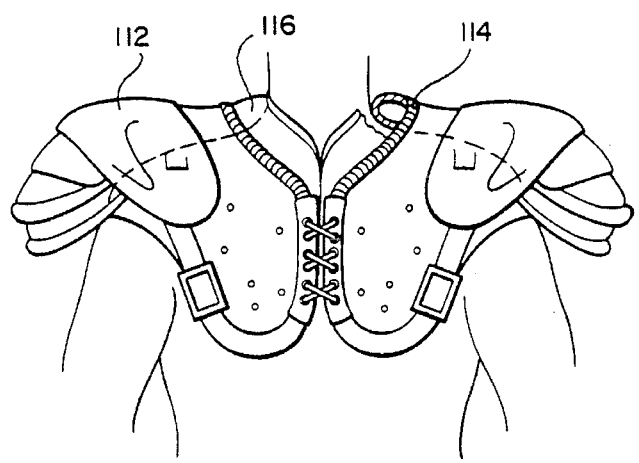
FIG. 17b is a front perspective of a player wearing the shoulder pad of FIG. 17a wherein the attachment as an inflatable bag is in an inflated condition along the inner rim encircling the neck of the wearer according to an embodiment of the present invention.

In FIG. 17a there is shown another embodiment of the present invention. Shoulder pads 112 are provided with an inflatable base means or ring module 114, similar to the ring module 34 provided on the helmet in FIG. 4. The shoulder pads in FIG. 17 are operable with the aforementioned type helmets. Ring module 114 has an inflatable bag therein. Circuit wires (not shown) extending from the same impact-operated switch used to operate the helmet's inflatable bag or extendable polycarbonate ring, as described above, allow the inflatable ring module 114 on shoulder pads 112 to be inflated in response to closure of the switch. FIG. 17b shows inflatable ring module 114 after the bag 116 carried therein has been inflated. The bag 116 extends inwardly towards the wearer's neck so as to provide the extendable polycarbonate ring or inflatable bag of the helmet a broader foundation to engage when extended. When extended bag 116, is of such dimension so as to be slightly spaced from the wearer's neck. While it is permissible for the bag to actually touch the wearer's neck, the bag must be properly sized so that it does not choke the wearer when inflated.

Figure 18:
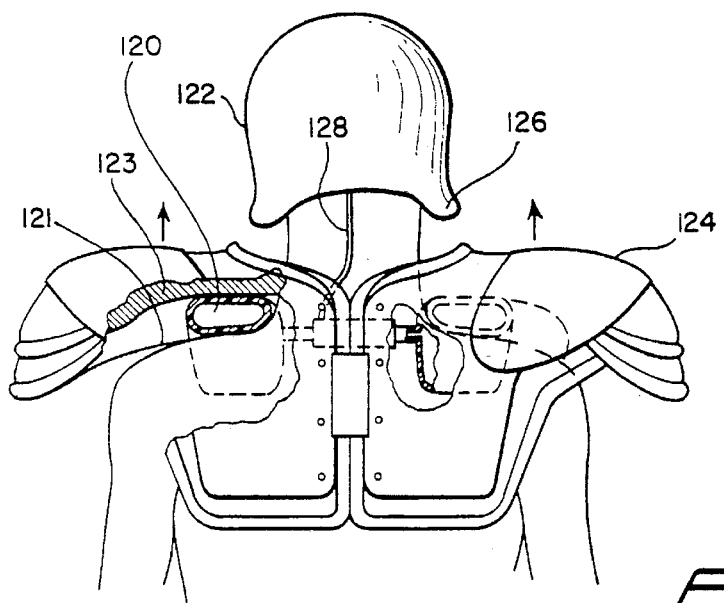
FIG. 18 is a rear cross sectional view of a player wearing a shoulder pad having an inflatable bag therein and a helmet with its lower rim having an outwardly extending flare according to an embodiment of the present invention.

In FIG. 18 there is shown another embodiment of the present invention. There, shoulder pads 124 are provided having an inflatable bag 120 therein between lower surface 121 and upper surface 123. The inflatable bag is similarly inflatable in response to operation of a switch, such as switch 100 in FIG. 16 or switch 46 in FIG. 4 in the crown area of helmet 122. Circuit wires 128 extend from the switch in the crown area of the helmet to an igniter, battery, and gas generator as described hereinbefore. In this embodiment, any one of the three aforementioned components may be provided within the helmet, but most preferably, they are provided in the shoulder pads themselves. When inflated, inflatable bag 120 operates to almost instantaneously raise the upper surface of shoulder pads 124 towards helmet 122. Helmet 122 is provided with a flared lower base 126 adapted to engage the upper surface of the shoulder pads when raised. As a result, the impact force is transmitted or transferred mainly to the shoulders, thus relieving the cervical spine of damaging axial compressive forces.

It will thus be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, this invention includes all embodiments encompassed within the spirit and scope of the following claims.

What is claimed is:

1. A helmet assembly for providing an indication when a predetermined axial compressive force tending to cause serious injury to the wearer is applied thereto, said assembly comprising:

a rigid helmet having a lower rim for at least partially encircling the head of the wearer, said helmet being defined by an exterior surface including a crown area;

a signalling device disposed within said helmet for providing a signal to said wearer when a predetermined amount of axial compressive force is applied to said crown area; and sensor means for actuating said signalling device in response to an external impact on said crown area with said predetermined amount of axial compressive force;

said helmet assembly further comprising an extensible means generally disposed along said lower rim and normally not projecting substantially below said lower rim but being extendable therebelow to engage the shoulders of the wearer and substantially transfer to the shoulders the force of an external impact on the crown area of said helmet; and gas-operable means carried by said helmet for extending said extensible means to engage the shoulders of a wearer within less than 25 milliseconds of an external impact on said crown area of said helmet, said gas-operable means including means carried by said helmet for almost instantaneously generating gas for operating said gas-operable means;

said sensor means being constructed and arranged to operate said gas-generating means in response to said external impact with said predetermined amount of force to rapidly extend said extensible means to engage the shoulders of a wearer so as to be able to transfer the impact force to the shoulders instead of directly through said helmet and head of the wearer generally axially to the cervical spine of the wearer.

2. The invention as claimed in claim 1 wherein said signalling device includes a speaker for providing a sound audible to the wearer of the helmet.

3. The invention as claimed in claim 1 wherein said signalling device includes a light for providing a visual signal visible to the wearer of the helmet.

4. The helmet assembly defined in claim 1 wherein said sensor means is carried in a shock absorbing patch attached to the crown area of the exterior surface of said helmet.

5. The helmet assembly defined in claim 1 wherein said sensor means provides a signal to said gas-generating means for operating said gas-generating means.

6. The helmet assembly defined in claim 5 wherein at least one wire connects said sensor means to said gas-generating means, and wherein said crown area of the exterior surface of said helmet has an orifice therein, said at least one wire extending from said sensor means through said orifice to said gas-generating means.

7. The helmet assembly defined in claim 4 wherein said shock absorbing patch comprises an elastomeric material capable of absorbing impact thereupon.

8. The helmet assembly defined in claim 1, wherein:

said extensible means comprises inflatable bag means attached to said lower rim, said bag means being normally deflated and restrictedly folded so as to not impede normal movements of the head and neck of the wearer, but constructed and arranged to fill the gap between said lower rim and the shoulders of a wearer when inflated; and said gas generating means being operable to almost instantaneously generate inflating gas and communicate said inflating gas to said bag means.

9. The helmet assembly defined in claim 8 including means for rapidly deflating the bag means a short time after inflation.

10. The helmet assembly defined in claim 8 including a channel-like downward facing shell which opens in a direction opposite the crown area of said helmet so as to allow said bag to expand toward the wearer's shoulders when inflated wherein the bag means is folded and packed and wrapped with a rupturable membrane.

11. The helmet assembly defined in claim 8 including a protective face guard attached to the helmet and extending over at least the eyes and nose of the wearer and having a lower portion and wherein the bag means is attached to said lower portion of said face guard and completely encircles the wearer, and a channel-like shell which opens in a direction facing away from the crown area of said helmet so as to allow said bag to expand toward a wearer's shoulders when inflated and wherein the bag means is folded and packed and wrapped with a rupturable membrane.

12. The helmet assembly defined in claim 1 wherein the sensor means comprises an adjustable accelerometer.

13. The helmet assembly defined in claim 1 wherein the extensible means comprises a polycarbonate plastic ring of small cross section padded with foam rubber.

14. The helmet assembly as defined in claim 1 wherein said gas operable means comprises a cylinder having a piston disposed in an interior portion thereof.

15. The helmet assembly as defined in claim 14, wherein:

said piston comprises a piston and a piston rod;

said gas generating means is operable to provide gas to a chamber within said cylinder formed by said cylinder and said piston; and an end of said piston rod opposite said piston is connected to said extensible means so as to extend said extensible means when said generating means provides gas to said gas operable means.

16. The helmet assembly as defined in claim 15, wherein said cylinder is formed integrally with said rigid helmet so that an interior surface of said rigid helmet is substantially smooth.

17. The helmet assembly as defined in claim 15, further comprising ratchet means for engaging said piston when extended to prevent said cylinder from becoming compressed.

18. The helmet assembly as defined in claim 1, further comprising detents for maintaining said extensible means in position when unextended by said gas operable means.

19. A helmet and shoulder pad assembly for providing an indication when a predetermined axial compressive force tending to cause serious injury to the wearer is applied thereto, said assembly comprising:

a rigid helmet having a lower rim for at least partially encircling the head of the wearer, said helmet being defined by an exterior surface including a crown area;

a signalling device disposed within said helmet for providing a signal to said wearer when a predetermined amount of axial compressive force is applied to said crown area;

sensor means for actuating said signalling device in response to an external impact on said crown area with said predetermined amount of axial compressive force;

extensible means generally disposed along said lower rim and normally not projecting substantially below said lower rim but being extendable therebelow to engage the shoulders of the wearer and substantially transfer to the shoulders the force of an external impact on the crown area of said helmet; gas-operable means carried by said helmet for extending said extensible means to engage the shoulders of a wearer within less than 25 milliseconds of an external impact on said crown area of said helmet, said gas-operable means, including means carried by said helmet for almost instantaneously generating gas for operating said gas-operable means;

said sensor means being constructed and arranged to operate said gas-generating means in response to said external impact with said predetermined amount of force to rapidly extend said extensible means to engage the shoulders of a wearer so as to be able to transfer the impact force to the shoulders instead of directly through said helmet and head of the wearer generally axially to the cervical spine of the wearer; and shoulder pads including inflatable base means for broadening the foundation on which the extensible means can engage, said inflatable base means being normally deflated and restrictedly folded so as to allow normal movements of the head and neck of the wearer, said inflatable base means being in the shape of a ring attached to the inner rim encircling the neck of the wearer, said inflatable base means extending inwardly towards the wearer's neck when inflated to instantaneously broaden the foundation on which the extensible means can engage upon impact.

20. The helmet and shoulder pad assembly defined in claim 20 wherein said inflatable base means is inflated by said gas generating means.

21. A helmet and shoulder pad assembly for providing an indication when a predetermined axial compressive force tending to cause serious injury to the wearer is applied thereto, said assembly comprising:

a helmet having a lower outwardly flared rim partially encircling the head of the wearer, said helmet having a crown area;

shoulder pads having an inner inflatable shoulder bag means for raising the shoulder pads to engage the flared rim of said helmet to transfer to the shoulder pads the force of an external impact on the crown area of said helmet;

gas-generating means for almost instantaneously generating gas for inflating said inflatable shoulder bag means to raise the shoulder pads upon an impact of predetermined force on said crown area of said helmet so that said shoulder pads engage the flared rim of said helmet of the wearer within about 25 milliseconds of the external impact on said crown area of said helmet;

sensor means disposed adjacent the crown area of said helmet for detecting the external impact on said crown area with said predetermined force and operating said gas-generating means in response thereto to almost instantaneously generate said gas to inflate said inflatable shoulder bag means to raise the shoulder pads so that said shoulder pads engage the flared rim of said helmet of the wearer within about 25 milliseconds of the external impact on said crown area so as to transfer the impact force to the shoulders instead of directly through said helmet and head of the wearer generally axially to the cervical spine of the wearer; and a signalling device disposed within said helmet for providing a signal to said wearer when a predetermined amount of axial compressive force is applied to said crown area, said sensor means being constructed and arranged to actuate said signalling device in response to said external impact on said crown area with said predetermined amount of axial compressive force.

22. A helmet for providing an indication when a predetermined axial compressire force tending to cause serious injury to the wearer is applied thereto, said assembly comprising: a rigid helmet having a lower rim for at least partially encircling the head of the wearer, said helmet being defined by an exterior surface including a crown area; a transmitting device carried by said helmet for transmitting a signal to a remote location when a predetermined amount of axial compressive force is applied to said crown area; sensor means for actuating said transmitting device in response to application of said predetermined amount of axial compressire force to said crown area; and receiving means disposed remotely from said helmet for receiving said signal transmitted by said transmitting device, extensible means generally disposed along said lower rim and normally not projecting substantially below said lower rim but being extendable therebelow to engage the shoulders of the wearer and substantially transfer to the shoulders the force of an external impact on the crown area of said helmet; and gas-operable means carried by said helmet for extending said extensible means to engage the shoulders of a wearer within less than 25 milliseconds of an external impact on said crown area of said helmet, said gas-operable means including means carried by said helmet for almost instantaneously generating gas for operating said gas-operable means; said sensor means being constructed and arranged to operate said gas-generating means in response to said external impact with said predetermined amount of force to rapidly extend said extensible means to engage the shoulders of a wearer so as to be able to transfer the impact force to the shoulders instead of directly through said helmet and head of the wearer generally axially to the cervical spine of the wearer.

23. The helmet assembly defined in claim 22, wherein:

said extensible means comprises inflatable bag means attached to said lower rim, said bag means being normally deflated and restrictedly folded so as to not impede normal movements of the head and neck of the wearer, but constructed and arranged to fill the gap between said lower rim and the shoulders of a wearer when inflated; and said gas generating means being operable to almost instantaneously generate inflating gas and communicate said inflating gas to said bag means.

24. The helmet assembly defined in claim 23 including means for rapidly deflating the bag means a short time after inflation.

25. The helmet assembly defined in claim 23 including a channel-like downward facing shell which opens in a direction opposite the crown area of said helmet so as to allow said bag to expand toward the wearer's shoulders when inflated wherein the bag means is folded and packed and wrapped with a rupturable membrane.

26. The helmet assembly defined in claim 23 including a protective face guard attached to the helmet and extending over at least the eyes and nose of the wearer and having a lower portion and wherein the bag means is attached to said lower portion of said face guard and completely encircles the wearer, and a channel-like shell which opens in a direction facing away from the crown area of said helmet so as to allow said bag to expand toward a wearer's shoulders when inflated and wherein the bag means is folded and packed and wrapped with a rupturable membrane.

27. The helmet assembly defined in claim 22, wherein the sensor means comprises an adjustable accelerometer.

28. A helmet and shoulder pad assembly for providing an indication when a predetermined axial compressive force tending to cause serious injury to the wearer is applied thereto, said assembly comprising:

a rigid helmet having a lower rim for at least partially encircling the head of the wearer, said helmet being defined by an exterior surface including a crown area;

sensor means for detecting an external impact of a predetermined amount of axial compressive force on said crown area;

a transmitting device carried by said helmet and responsive to said sensor means for transmitting a signal to a remote location when said predetermined amount of axial compressive force is applied to said crown area;

receiving means disposed remotely from said helmet for receiving said signal transmitted by said transmitting device;

extensible means generally disposed along said lower rim and normally not projecting substantially below said lower rim but being extendable therebelow to engage the shoulders of the wearer and substantially transfer to the shoulders the force of an external impact on the crown area of said helmet;

gas-operable means carried by said helmet for extending said extensible means to engage the shoulders of a wearer within less than 25 milliseconds of an external impact on said crown area of said helmet, said gas-operable means including means carried by said helmet for almost instantaneously generating gas for operating said gas-operable means;

said sensor means being constructed and arranged to operate said gas-generating means in response to said external impact with said predetermined amount of force to rapidly extend said extensible means to engage the shoulders of a wearer so as to be able to transfer the impact force to the shoulders instead of directly through said helmet and head of the wearer generally axially to the cervical spine of the wearer; and shoulder pads including inflatable base means for broadening the foundation on which the extensible means can engage, said inflatable base means being normally deflated and restrictedly folded so as to allow normal movements of the head and neck of the wearer, said inflatable base means being in the shape of a ring attached to the inner rim encircling the neck of the wearer, said inflatable base means extending inwardly towards the wearer's neck when inflated to instantaneously broaden the foundation on which the extensible means can engage upon impact.

29. The helmet and shoulder pad assembly defined in claim 28 wherein said inflatable base means is inflated by said gas generating means.

30. A helmet and shoulder pad assembly for providing an indication when a predetermined axial compressive force tending to cause serious injury to the wearer is applied thereto, said assembly comprising:

a helmet having a lower outwardly flared rim partially encircling the head of the wearer, said helmet having a crown area;

shoulder pads having an inner inflatable shoulder bag means for raising the shoulder pads to engage the flared rim of said helmet to transfer to the shoulder pads the force of an external impact on the crown area of said helmet;

gas-generating means for almost instantaneously generating gas for inflating said inflatable shoulder bag means to raise the shoulder pads upon an impact of predetermined force on said crown area of said helmet so that said shoulder pads engage the flared rim of said helmet of the wearer within about 25 milliseconds of the external impact on said crown area of said helmet;

sensor means disposed adjacent the crown area of said helmet for detecting the external impact on said crown area with said predetermined force and operating said gas-generating means in response thereto to almost instantaneously generate said gas to inflate said inflatable shoulder bag means to raise the shoulder pads so that said shoulder pads engage the flared rim of said helmet of the wearer within about 25 milliseconds of the external impact on said crown area so as to transfer the impact force to the shoulders instead of directly through said helmet and head of the wearer generally axially to the cervical spine of the wearer;

a transmitting device carried by said helmet and responsive to said sensor means for transmitting a signal to a remote location when said predetermined amount of axial compressive force is applied to said crown area; and receiving means disposed remotely from said helmet for receiving said signal transmitted by said transmitting device.

31. A helmet assembly for providing an indication when a predetermined axial compressive force tending to cause serious injury to the wearer is applied thereto, said assembly comprising:

a rigid helmet having a lower rim for at least partially encircling the head of the wearer, said helmet being defined by an exterior surface including a crown area;

a signalling device disposed within said helmet for providing a signal to said wearer when a predetermined amount of axial compressive force is applied to said crown area; and sensor means for actuating said signalling device in response to an external impact on said crown area with said predetermined amount of axial compressive force;

a transmitting device carried by said helmet for transmitting a signal to a remote location when a predetermined amount of axial compressive force is applied to said crown area; and receiving means disposed remotely from said helmet for receiving said signal transmitted by said transmitting device.

* * * * *